US011739648B2

(12) United States Patent
Sasao et al.

(10) Patent No.: US 11,739,648 B2
(45) Date of Patent: Aug. 29, 2023

(54) STEAM TURBINE ROTOR BLADE AND MANUFACTURING METHOD AND REMODELING METHOD OF STEAM TURBINE ROTOR BLADE

(71) Applicant: MITSUBISHI HEAVY INDUSTRIES, LTD., Tokyo (JP)

(72) Inventors: Yasuhiro Sasao, Tokyo (JP); Soichiro Tabata, Tokyo (JP); Ryo Takata, Tokyo (JP); Takeshi Kudo, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/531,207

(22) Filed: Nov. 19, 2021

(65) Prior Publication Data

US 2022/0162949 A1 May 26, 2022

(30) Foreign Application Priority Data

Nov. 25, 2020 (JP) ................................ 2020-195377

(51) Int. Cl.
*F01D 5/22* (2006.01)
*F01D 25/32* (2006.01)
(Continued)

(52) U.S. Cl.
CPC ............ *F01D 5/22* (2013.01); *F05D 2230/10* (2013.01); *F05D 2260/602* (2013.01)

(58) Field of Classification Search
CPC ............. F05D 2220/31; F05D 2240/30; F05D 2240/303; F05D 2240/307;
(Continued)

(56) References Cited

U.S. PATENT DOCUMENTS 6,976,826 B2 * 12/2005 Roy .......................... F01D 5/20 416/500
2017/0167301 A1 6/2017 Fandrei, II
2019/0170004 A1 6/2019 McCune

FOREIGN PATENT DOCUMENTS

JP 2007-187053 A 7/2007
JP 2016-166569 A 9/2016
JP 2017218983 A * 12/2017

OTHER PUBLICATIONS

Machine Translation of JP 2017218983A [retrieved on Feb. 2, 2023], Retrieved from: Espacenet. (Year: 2023).*

(Continued)

*Primary Examiner* — Eric J Zamora Alvarez
(74) *Attorney, Agent, or Firm* — WHDA, LLP

(57) ABSTRACT

Water droplets that are moved on blade surfaces of a rotor blade are effectively guided toward the blade trailing edge while influence on the strength of the rotor blade is suppressed. A steam turbine rotor blade having a tie-boss for joining to adjacent blades at an intermediate position in the blade length direction is provided. The steam turbine rotor blade includes an airfoil part in which a blade surface is partly hollow as viewed in a section obtained by cutting by an orthogonal plane to a rotation center line of a turbine and a recessed blade surface that is this hollow partial blade surface passes through the blade root side of the tie-boss at least in a region on the pressure side and extends in a strip shape in the blade chord length direction.

6 Claims, 8 Drawing Sheets

(51) Int. Cl.
*F01D 5/14* (2006.01)
*B23P 15/02* (2006.01)
*B24C 1/10* (2006.01)

(58) Field of Classification Search
CPC ........... F05D 2240/123; F05D 2260/96; F05D 2260/602; F05D 2240/122; F05D 2260/95; F05D 2230/10; F05D 2300/51; F05D 2300/603; F05D 2240/121; F05D 2240/124; F05D 2240/304; F05D 2240/306; F05D 2240/305; F05D 2250/182; F05D 2250/294; F05D 2240/12; F05D 2250/12; F05D 2250/11; F05D 2250/13; F05D 2240/80; F05D 2250/61; F05D 2240/126; F05D 2240/125; F05D 2240/127; F01D 5/147; F01D 5/225; F01D 9/041; F01D 25/32; F01D 5/141; F01D 5/22; F01D 5/16; F01D 5/286; F01D 5/14; F01D 5/26; F01D 5/143; F01D 5/146; F04D 29/324; F04D 29/326; F04D 29/388; F04D 29/668; B23P 15/02; B24C 1/10
See application file for complete search history.

(56) References Cited

OTHER PUBLICATIONS

Machine Translation of JP 2016166569A [retrieved on Feb. 2, 2023], Retrieved from: Espacenet. (Year: 2023).*
Office Action dated Jun. 7, 2022, issued in counterpart IN Application No. 202114052359, with English Translation. (5 pages).
Office Action dated Dec. 20, 2022, issued in counterpart JP Application No. 2020-195377, with English Translation. (6 pages).

* cited by examiner

STEAM TURBINE ROTOR BLADE AND MANUFACTURING METHOD AND REMODELING METHOD OF STEAM TURBINE ROTOR BLADE

BACKGROUND OF THE INVENTION

1. Field of the Invention

The present invention relates to a steam turbine rotor blade and manufacturing method and remodeling method of a steam turbine rotor blade.

2. Description of the Related Art

In the steam turbine, the temperature of steam decreases in the process in which the energy of the steam that flows from a high pressure stage to a low pressure stage is transformed into mechanical work, and part of the steam condenses and fine water droplets are generated. Thus, the liquid phase, i.e. the fine water droplets, exists besides the gas phase in the steam that drives the steam turbine, and the amount of fine water droplets entrained by the gas phase is larger at a lower pressure stage. At the low pressure stage, the fine water droplets are captured by blade surfaces of stator blades and these fine water droplets adsorb each other and coarsen in the process in which the fine water droplets are transferred by the drag from the gas phase on the blade surfaces toward the downstream side. Then, the fine water droplets captured by the surfaces of stator blade form water films, water rivulets or coarse water droplet, and reach a trailing edge of the blade. In the description, these three states of the water film formation, namely "water film", "water rivulet" and "coarse water droplet" are collectively described as "coarse water droplet" unless otherwise specified. The water droplets are entrained by the gas phase again as coarse water droplets. A portion of these water droplets that have been separated from the stator blades are captured by blade surfaces of rotor blades on the downstream side. The water droplets that have been captured by the blade surfaces of the rotor blades get kinetic energy in the process in which the water droplets receive a centrifugal force associated with the rotation of the rotor blades and are moved on the blade surfaces of the rotor blade toward the blade tip side, and lower the turbine efficiency and are scattered to cause erosion. It is desired to suppress the erosion by letting out water droplets to the downstream side or removing the water droplets halfway.

As a countermeasure against it, a configuration in which grooves that each extend from the vicinity of a leading edge to the vicinity of the trailing edge are made in suction side surfaces and pressure side surfaces of rotor blades and water droplets that are moved on the blade surfaces of the rotor blade toward the blade tip side are guided to the blade trailing edge side by the groove is disclosed in JP-2016-166569-A.

PRIOR ART DOCUMENT

Patent Document

Patent Document 1: JP-2016-166569-A

In recent years, the rotation speed of the steam turbine has become high, and particularly, the design of a rotor blade with a long blade length has been becoming extremely severe. Although the specific configuration of the groove is not described in JP-2016-166569-A, additional processing of the groove on the blade surfaces of the rotor blade greatly affects the blade strength and application of the additional processing of the groove to the rotor blades of recent years, particularly rotor blades with a long blade length, is difficult in actual circumstances.

An object of the present invention is to provide a steam turbine rotor blade and manufacturing method and remodeling method of a steam turbine rotor blade that allow water droplets that are moved on blade surfaces of a rotor blade to be effectively guided toward the blade trailing edge while suppressing influence on the strength of the rotor blade.

SUMMARY OF THE INVENTION

In order to achieve the above-described object, the present invention provides a steam turbine rotor blade having a tie-boss for joining to adjacent blades at an intermediate position in the blade length direction. The steam turbine rotor blade includes an airfoil part in which a blade surface is partly hollow as viewed in a section obtained by cutting by an orthogonal plane to a rotation center line of a turbine and a recessed blade surface that is the hollow partial blade surface passes through the blade root side of the tie-boss at least in a region on the pressure side and extends in a strip shape in the blade chord length direction.

According to the present invention, water droplets that are moved on blade surfaces of a rotor blade can be effectively guided toward the blade trailing edge while influence on the strength of the rotor blade is suppressed.

DESCRIPTION OF THE PREFERRED EMBODIMENTS

An embodiment of the present invention will be described below by using the drawings.

—Steam Turbine Power Generation Facility—

Figure 1:
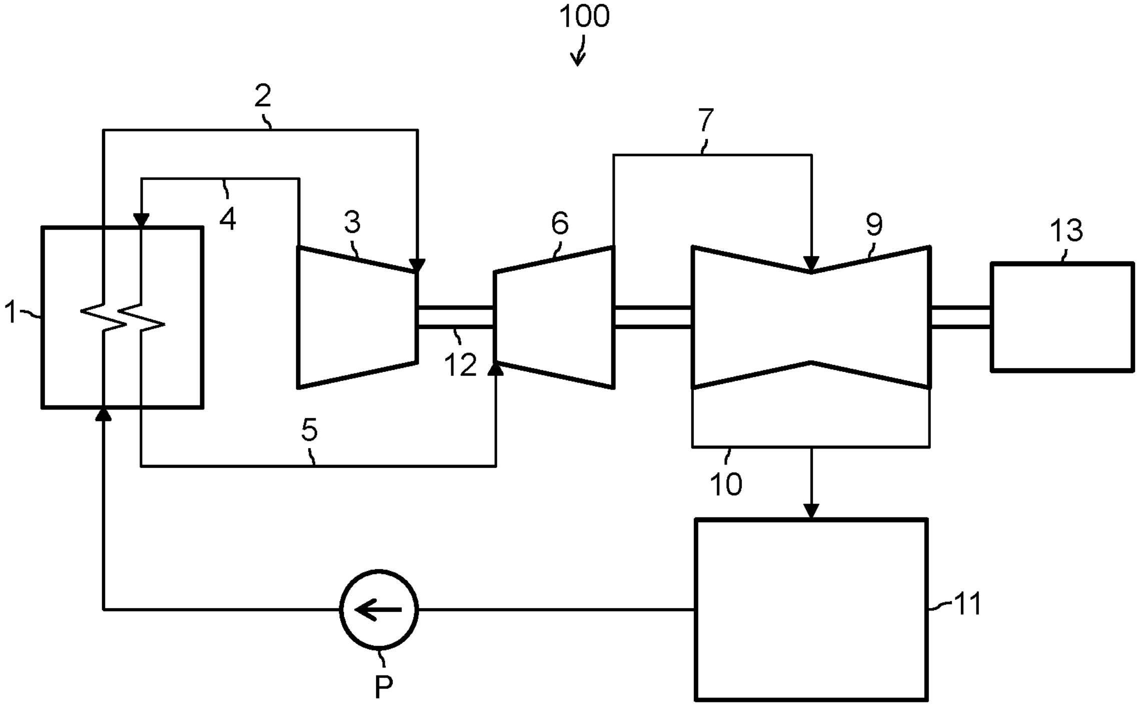
FIG. 1 is a figure that schematically represents one example of a steam turbine facility in which steam turbine rotor blades according to one embodiment of the present invention are used.

FIG. 1 is a figure that schematically represents one example of a steam turbine facility in which steam turbine rotor blades according to one embodiment of the present invention are used. A steam turbine power generation facility 100 illustrated in this figure includes a steam generation source 1, a high pressure turbine 3, a middle pressure turbine 6, a low pressure turbine 9, a condenser 11, and load equipment 13.

The steam generation source 1 is a boiler and heats water supplied from the condenser 11 to generate high-temperature, high-pressure steam. The steam generated by the steam generation source 1 is introduced to the high pressure turbine 3 through a main steam pipe 2 and drives the high pressure turbine 3. The steam subjected to temperature decrease and pressure reduction through driving the high pressure turbine 3 is introduced to the steam generation source 1 through a high pressure turbine discharge pipe 4 and is heated again to become reheat steam.

The reheat steam generated by the steam generation source 1 is introduced to the middle pressure turbine 6 through a reheat steam pipe 5 and drives the middle pressure turbine 6. The steam subjected to temperature decrease and pressure reduction through driving the middle pressure turbine 6 is introduced to the low pressure turbine 9 through a middle pressure turbine discharge pipe 7 and drives the low pressure turbine 9. The steam further subjected to temperature decrease and pressure reduction through driving the low pressure turbine 9 is introduced to the condenser 11 through a diffuser. The condenser 11 includes a cooling water pipe (not illustrated) and causes the steam introduced to the condenser 11 and cooling water that flows in the cooling water pipe to carry out heat exchange and condenses the steam. The water condensed by the condenser 11 is sent to the steam generation source 1 again by a water feed pump P.

Turbine rotors 12 of the high pressure turbine 3, the middle pressure turbine 6, and the low pressure turbine 9 are coaxially joined. The load equipment 13 is typically an electric generator and is joined to the turbine rotor 12 and is driven by the rotation output power of the high pressure turbine 3, the middle pressure turbine 6, and the low pressure turbine 9.

As the load equipment 13, a pump is employed instead of the electric generator in some cases. Furthermore, although the configuration including the high pressure turbine 3, the middle pressure turbine 6, and the low pressure turbine 9 is exemplified, a configuration in which the middle pressure turbine 6 is omitted may be employed, for example. Although the configuration in which the same load equipment 13 is driven by the high pressure turbine 3, the middle pressure turbine 6, and the low pressure turbine 9 is exemplified, a configuration in which pieces of load equipment different from each other are driven by each the high pressure turbine 3, the middle pressure turbine 6, and the low pressure turbine 9 may be employed. A configuration in which the high pressure turbine 3, the middle pressure turbine 6, and the low pressure turbine 9 are divided into two groups (that is, two turbines and one turbine) and a respective one of pieces of load equipment is driven in each group may be employed. Moreover, although the configuration including a boiler as the steam generation source 1 is exemplified, a configuration in which a heat recovery steam generator (HRSG) that uses waste heat of a gas turbine is employed as the steam generation source 1 may be employed. That is, the steam turbine rotor blade to be described later can be used also for a combined cycle power generation facility. The steam turbine rotor blade to be described later can be applied also to a steam turbine used for geothermal power generation or atomic power generation.

—Steam Turbine—

Figure 2:
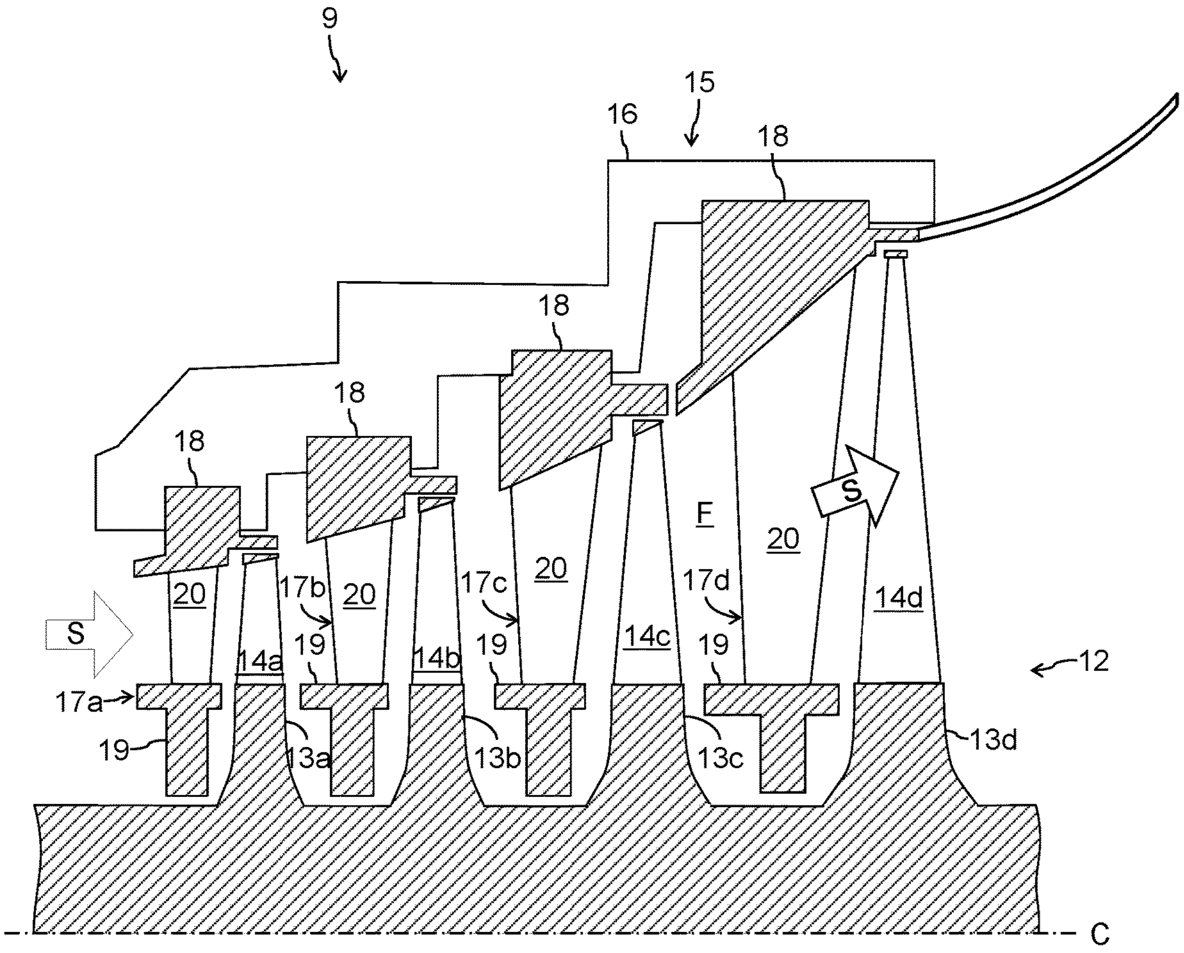
FIG. 2 is a sectional view that is a sectional view of a steam turbine in which the steam turbine rotor blades according to the one embodiment of the present invention are used and is obtained by cutting by a plane that passes through a rotation center line of a turbine rotor.

FIG. 2 is a sectional view of the low pressure turbine 9 obtained by cutting by a plane that passes through the rotation center line of the turbine rotor 12, i.e. a sectional view by a meridian plane. As illustrated in this figure, the low pressure turbine 9 includes the above-described turbine rotor 12 and a stationary body 15 that covers it. A diffuser is disposed at the outlet of the stationary body 15. In the specification of the present application, the rotational direction of the turbine rotor 12 is defined as "circumferential direction," and the direction in which a rotation center line C of the turbine rotor 12 extends is defined as "axial direction," and the radial direction of the turbine rotor 12 is defined as "radial direction."

The turbine rotor 12 includes rotor discs 13*a* to 13*d* and rotor blades 14*a* to 14*d*. The rotor discs 13*a* to 13*d* are members each having a circular disc shape and are disposed in such a manner as to be overlapped in the axial direction. The rotor discs 13*a* to 13*d* are disposed in such a manner that they and spacers are alternately overlapped in some cases. The plural rotor blades 14*a* are disposed on the outer circumferential surface of the rotor disc 13*d* at equal intervals in the circumferential direction. Similarly, as the rotor blades 14*a* to 14*c*, plural rotor blades are disposed on the outer circumferential surfaces of the rotor discs 13*a* to 13*c*, respectively, at equal intervals in the circumferential direction. The rotor blades 14*a* to 14*d* extend outward in the radial direction from the outer circumferential surfaces of the rotor discs 13*a* to 13*d* and face a working fluid flow path F with a cylindrical shape. The energy of steam S that flows in the working fluid flow path F is transformed into mechanical work by the rotor blades 14*a* to 14*d* and the turbine rotor 12 is integrally rotated around the rotation center line C.

The stationary body 15 includes a casing 16 and diaphragms 17*a* to 17*d*. The casing 16 is a cylindrical member that forms an outer circumferential wall of the low pressure turbine 9. The diaphragms 17*a* to 17*d* are attached to the inner circumferential part of this casing 16. The diaphragms 17*a* to 17*d* are segments that configure blade rows of stator blades, and each include a diaphragm outer ring 18, a diaphragm inner ring 19, and plural stator blades 20 and are integrally formed. Plural diaphragms are disposed in the circumferential direction to form an annular shape as each of the diaphragms 17*a* to 17*d* and configure blade rows of the stator blades 20 of plural stages (in FIG. 2, four stages).

The diaphragm outer ring 18 is a member that defines the outer circumference of the working fluid flow path F by its inner circumferential surface and is supported by the inner circumferential surface of the casing 16. Plural diaphragm outer rings 18 are disposed in the circumferential direction to form a ring. In the present embodiment, the inner circumferential surface of the diaphragm outer ring 18 is inclined outward in the radial direction toward the downstream side (rightward in FIG. 2). The diaphragm inner ring 19 is a member that defines the inner circumference of the working fluid flow path F by its outer circumferential surface and is disposed inside in the radial direction relative to the diaphragm outer ring 18. Plural diaphragm inner rings 19 are disposed in the circumferential direction to form a ring. The stator blades 20 are disposed in such a manner that the plural stator blades 20 are lined up in the circumferential direction at each stage, and extend in the radial direction to couple the diaphragm inner ring 19 and the diaphragm outer ring 18 to each other.

The stator blades 20 and the rotor blades adjacent to them on the downstream side configure one stage. In the present embodiment, the stator blades 20 of the diaphragms 17*a* and the rotor blades 14*a* configure a first stage (initial stage). Similarly, the stator blades 20 of the diaphragms 17*b* and the rotor blades 14*b* configure a second stage, and the stator blades 20 of the diaphragms 17*c* and the rotor blades 14*c* configure a third stage, and the stator blades 20 of the diaphragms 17*d* and the rotor blades 14*d* configure a fourth stage (last stage).

—Steam Turbine Rotor Blade—

Figure 3:
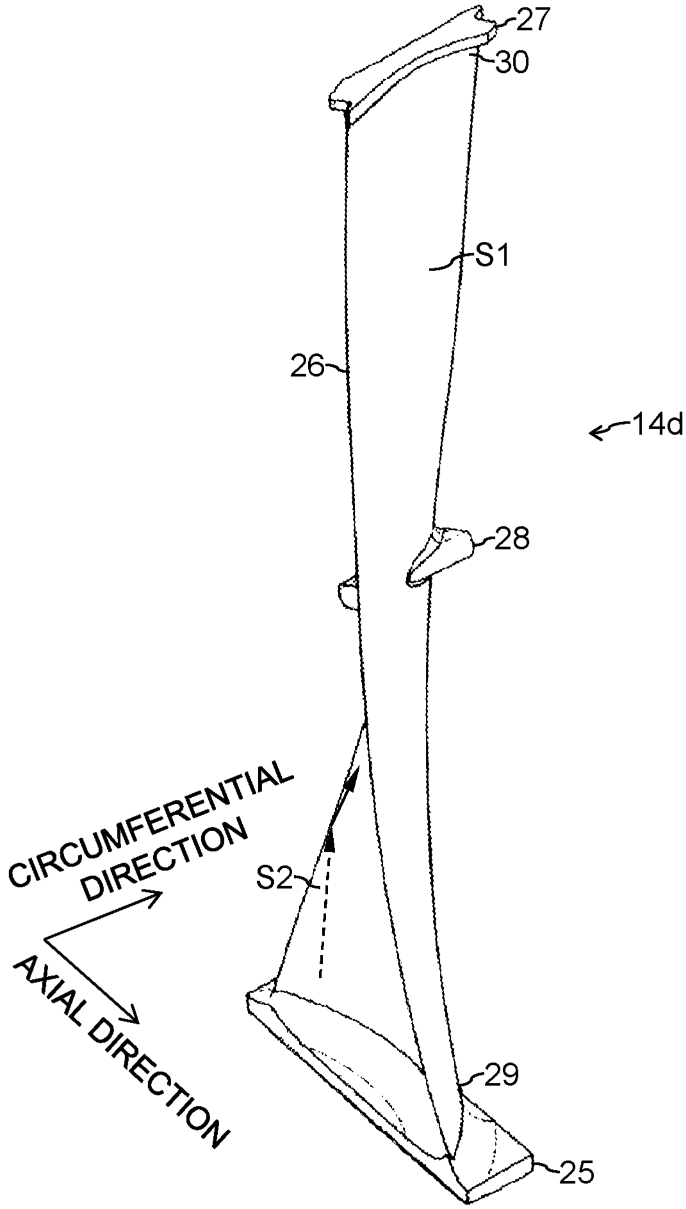
FIG. 3 is a perspective view that represents the appearance configuration of a single piece of the steam turbine rotor blade according to the one embodiment of the present invention.
Figure 4:
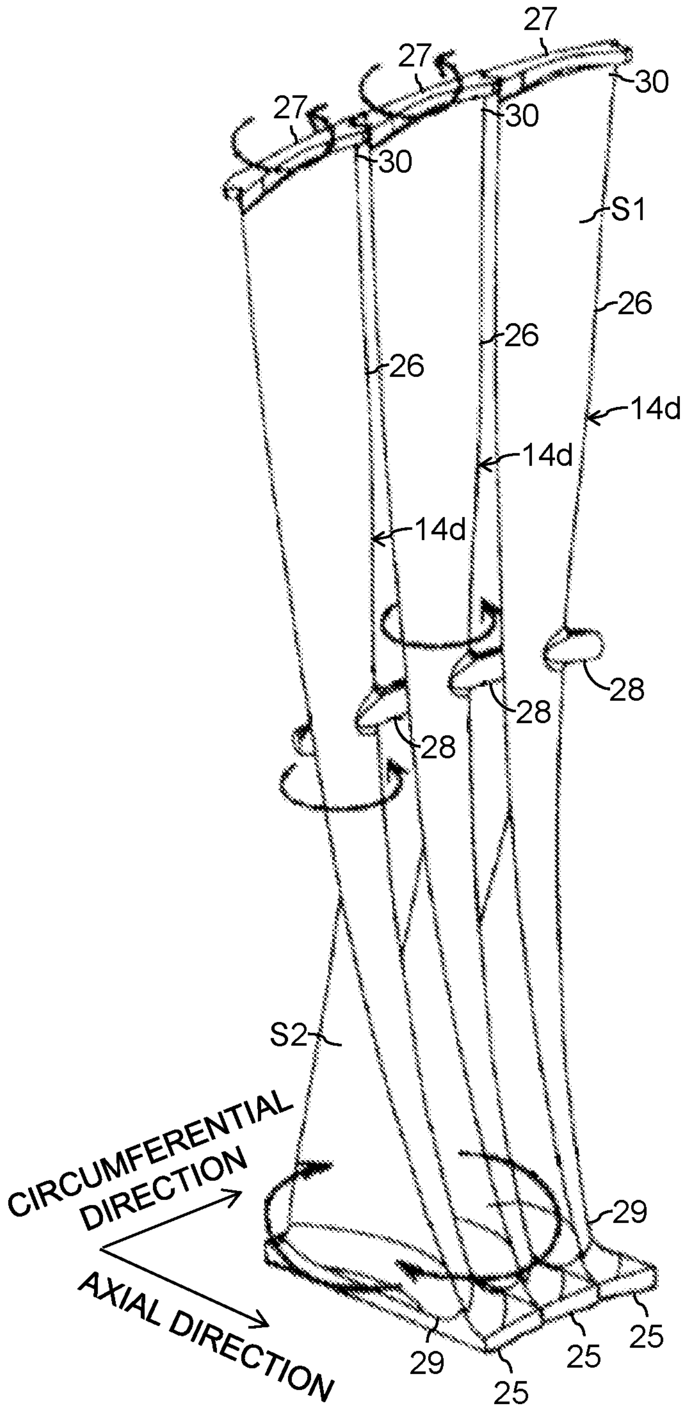
FIG. 4 is a perspective view that extracts and represents part of a blade row configured by the steam turbine rotor blades according to the one embodiment of the present invention.

FIG. 3 is a perspective view that represents the appearance configuration of a single piece of the rotor blade. FIG. 4 is a perspective view that extracts and represents part of a blade row configured by plural rotor blades. The rotor blades represented in these figures are what is referred to as a so-called long blade and rotor blades with a similar configuration can be used at the last stage or the last plural stages of the low pressure turbine 9. In the long blade of recent years, the Mach number of the circumferential speed of the rotor blade tip exceeds 1.0 in many cases. The rotor blades illustrated in FIG. 3 and FIG. 4 will be explained as the rotor blades 14*d* of the last stage. However, the rotor blades used at the other stages also have a similar configuration.

The rotor blades 14*d* illustrated in FIG. 3 and FIG. 4 each include a platform 25, an airfoil part (profile part) 26, an integral cover 27, and a tie-boss 28.

The platform 25 supports a root part (inside part in the radial direction) 29 of the airfoil part 26 and has an implanted part (not illustrated) that protrudes to the opposite side to the airfoil part 26 (that is, inside in the radial direction). Through fitting of this implanted part into a groove formed in the outer circumferential surface of the rotor disc 13*d* (FIG. 2), the rotor blade 14*d* is fixed to the rotor disc 13*d*.

The airfoil part 26 is a part that transforms the energy of the steam into mechanical work and extends outward in the radial direction from the outer circumferential surface of the platform 25. The airfoil part 26 is twisted in the clockwise direction as viewed from the outside in the radial direction in the present embodiment. However, a configuration in which the airfoil part 26 is twisted in the opposite direction is employed in some cases.

The integral cover 27 is one of joining parts between the rotor blades 14*d* adjacent in the circumferential direction and is disposed at a tip part (end part on the outside in the radial direction) 30 of the airfoil part 26. The surface oriented inward in the radial direction in the integral cover 27 defines the outer circumference of the working fluid flow path F. When the rotor blade 14*d* is rotated, a centrifugal force is received and the airfoil part 26 is twisted in such a direction as to eliminate the twist. Thus, the integral covers 27 of the rotor blades 14*d* adjacent in the circumferential direction get contact with each other due to the detorsion of the airfoil part 26 and thereby the adjacent blades are joined to each other (FIG. 4).

The tie-boss 28 is one of the joining parts between the rotor blades 14*d* adjacent in the circumferential direction and is disposed between the root part 29 and the tip part 30 of the airfoil part 26 and, in the present embodiment, at an intermediate part in the blade length direction of the airfoil part 26 (radial direction). The tie-boss 28 is disposed on a suction side surface S1 and a pressure side surface S2 of the rotor blade 14*d* in such a manner as to protrude from each blade surface. As with the integral cover 27, when the rotor blades 14*d* is rotated, the tie-bosses 28 on the suction and pressure sides of the rotor blades 14*d* adjacent in the circumferential direction get contact with each other due to the detorsion of the airfoil part 26 and thereby the adjacent blades are joined to each other (FIG. 4). Although the case in which the tie-boss 28 is set at the central part of the airfoil part 26 in the blade length direction is exemplified in FIG. 3 and FIG. 4, the position of the tie-boss 28 in the blade length direction can be changed according to the torsional rigidity of the airfoil part 26 and so forth.

—Airfoil—

Figure 5:
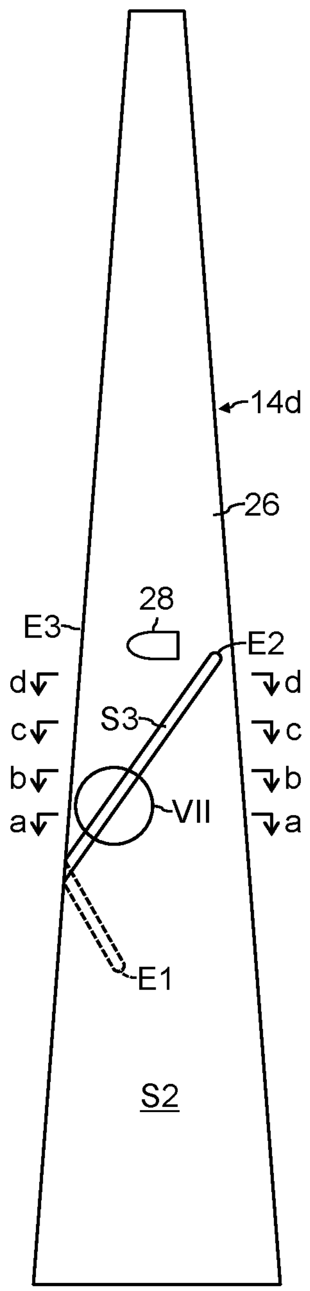
FIG. 5 is a schematic figure of the rotor blade of the last stage in FIG. 2.
Figure 6:
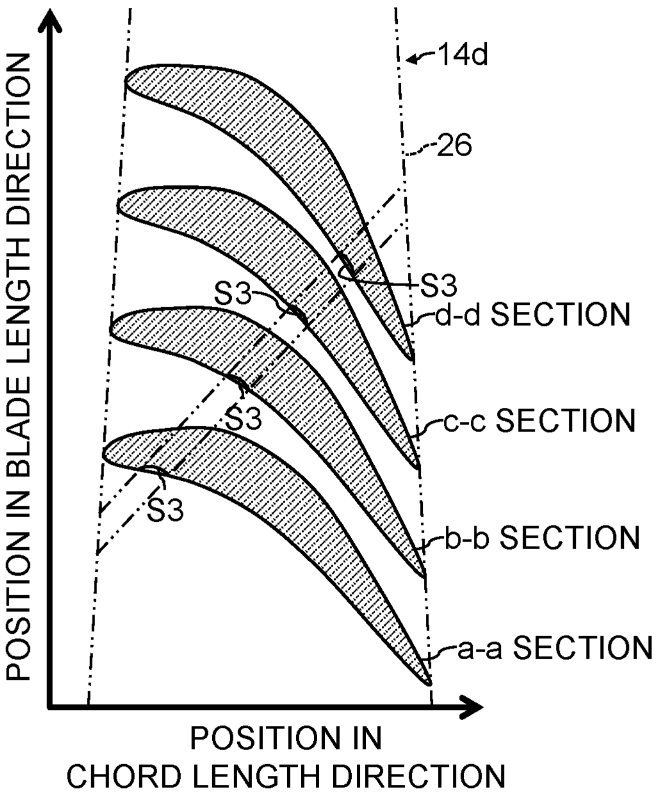
FIG. 6 is a figure in which sections (airfoil) of the rotor blade by line a-a, line b-b, line c-c, and line d-d in FIG. 5 are represented in one figure.
Figure 7:
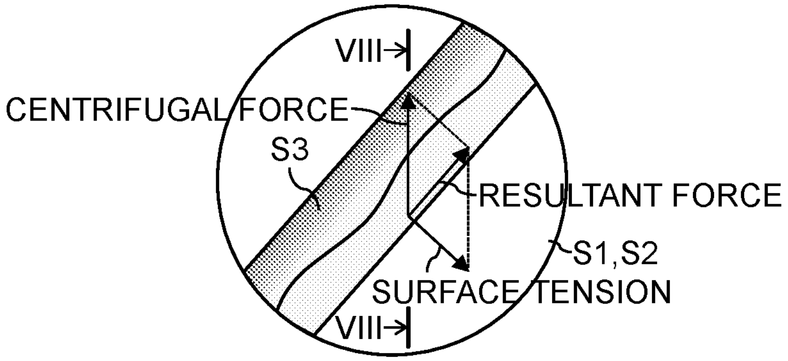
FIG. 7 is an enlarged view of part VII in FIG. 5.
Figure 8:
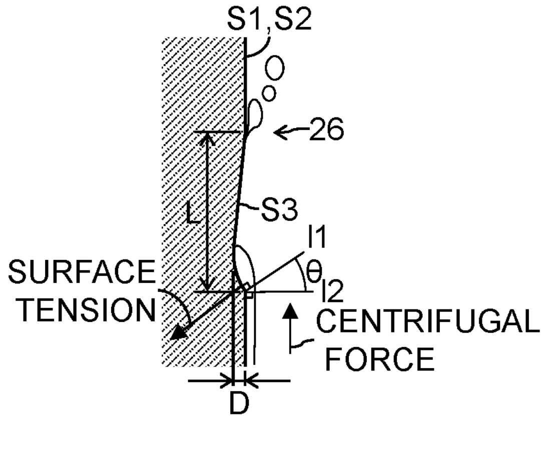
FIG. 8 is a sectional view of a recessed blade surface by line VIII-VIII in FIG. 7.

FIG. 5 is a schematic figure of the airfoil part of the rotor blade of the last stage in FIG. 2. FIG. 6 is a figure in which sections (airfoil) of the rotor blade by line a-a, line b-b, line c-c, and line d-d in FIG. 5 are represented in one figure. FIG. 7 is an enlarged view of part VII in FIG. 5. FIG. 8 is a sectional view of a recessed blade surface by line VIII-VIII in FIG. 7. These figures illustrate the rotor blade 14*d* as a representative. However, when long blades are used also for a stage other than the last stage, a similar configuration can be applied to not only the rotor blades 14*d* of the last stage but also the rotor blades (long blades) of the last plural stages.

The rotor blades 14*a* to 14*d* are fabricated with high accuracy through carving-out by mechanical processing from a press-molded or cast-molded material (not illustrated). Therefore, a machining allowance of several millimeters is ensured for the whole surface for the airfoil part of the material. In the present embodiment, the rotor blades 14*d* of the last stage or the rotor blades (long blades) of the last plural stages have an airfoil in which the blade surface is partly hollow as viewed in a section obtained by cutting by an orthogonal plane to the rotation center line C of the turbine rotor 12 as illustrated in FIG. 8.

Hereinafter, this hollow partial blade surface will be referred to as the recessed blade surface S3. The rotor blades 14*d* have an airfoil into which the recessed blade surface S3 is incorporated, in other words, an airfoil in which the recessed blade surface S3 is shaped through partly changing the curvature of the blade surface (or making inflection) on the basis of the position in the blade length direction.

The airfoil part of the rotor blade 14*d* is carved out from a material by mechanical processing of the machining allowance including the recessed blade surface S3. That is, the depth of the deepest part of the recessed blade surface S3 from the suction side surface S1 or the pressure side surface S2 is limited to at most the machining allowance of the material in the mechanical processing, for example approximately 2 mm. In other words, the recessed blade surface S3 is designed in the range of profile adjustment of the airfoil. The suction side surface S1 and the pressure side surface S2 excluding the recessed blade surface S3 (hereinafter, when a representation is made as the suction side surface S1 or the pressure side surface S2, this means the blade surface excluding the recessed blade surface S3) are designed with an emphasis on the aerodynamic performance while the balance between the strength of the rotor blade and the mass distribution is taken into consideration. In contrast, the recessed blade surface S3 is designed in consideration of the balance among the strength of the rotor blade, the mass distribution, and the aerodynamic performance while a function of inducing water droplets on the blade surface is ensured.

As illustrated in FIG. 5, the recessed blade surface S3 is located at an intermediate position in the blade length direction (upward-downward direction in this figure) in the rotor blade, and passes through the blade root side of the tie-boss 28 on the suction side and the pressure side and extends in a strip shape in the chord length direction of the rotor blade. As illustrated in this figure, a starting end E1 of the recessed blade surface S3 is located on the suction side surface S1 of the rotor blade and a terminal end E2 is located on the pressure side surface S2 of the rotor blade. In the present example, the starting end E1 of the recessed blade surface S3 is located at an intermediate position in the chord length direction in the suction side surface S1 of the rotor blade. The terminal end E2 of the recessed blade surface S3 is located in a region on the trailing edge side of the pressure side surface S2 and is separate from the trailing edge of the rotor blade by a certain distance. The recessed blade surface S3 is continuous from the starting end E1 to the terminal end E2 via a blade leading edge E3 of the rotor blade. The range in which the recessed blade surface S3 is formed in the blade surface of the rotor blade is only the region from the starting end E1 to the terminal end E2 as viewed in the radial direction, and the recessed blade surface does not exist in the region on the trailing edge side relative to the starting end E1 in the suction side surface S1 and the region on the trailing edge side relative to the terminal end E2 in the pressure side surface S2.

As illustrated in FIG. 5, the recessed blade surface S3 extends in such a manner that the distance from the blade root (in other words, rotor disc 13*d* (FIG. 2)) monotonically increases from the starting end E1 to the terminal end E2, and is uniformly inclined with respect to the rotation center line C in the present embodiment. Therefore, on the suction side of the rotor blade, the recessed blade surface S3 is inclined outward in the radial direction toward the leading edge (dashed line in FIG. 5). On the pressure side of the rotor blade, the recessed blade surface S3 is inclined outward in the radial direction toward the trailing edge (solid line in FIG. 5). At an intermediate part in the blade length direction, the profile shape of the pressure side surface S2 is set in such a manner that, as illustrated in FIG. 6, the position of the recessed blade surface S3 continuously moves from the blade leading edge side to the blade trailing edge side as the position of the section gets closer to the blade tip. On the contrary, at the intermediate part in the blade length direction, the profile shape of the suction side surface S1 is set in such a manner that the position of the recessed blade surface S3 continuously moves from the blade trailing edge side to the blade leading edge side as the position of the section gets closer to the blade tip. Since the recessed blade surface S3 is continuous, the existence region of the suction side part of the recessed blade surface S3 is closer to the blade root side than the existence region of the pressure side part of the recessed blade surface S3 as illustrated in FIG. 5.

Furthermore, as illustrated in FIG. 5, an opening length L (FIG. 8) of the recessed blade surface S3 taken in the blade length direction is set smaller than the width of the tie-boss 28 taken in the same direction. The recessed blade surface S3 is an extremely shallow dimple with a strip shape and a depth D of the recessed blade surface S3 taken in the normal direction of the blade surface (suction side surface S1 or pressure side surface S2) is further smaller than the opening length L of the recessed blade surface S3 (FIG. 8). In the present embodiment, the deepest part of the recessed blade surface S3 is offset toward the blade root side, and the average curvature of the part on the blade root side in the recessed blade surface S3 is set higher relative to the average curvature of the part on the blade tip side.

In a section of the rotor blade obtained by cutting by a specific orthogonal plane to the rotation center line C, the sectional shape of the recessed blade surface S3 can be set in a range of, for example, $L/D>2$, and $2<L/D<100$ in practice, when the aspect ratio of the opening length L and the depth D of the recessed blade surface S3 is defined as L/D. Suppose that the "specific orthogonal plane" is, for example, the plane with which the opening length L becomes the minimum excluding the starting end E1 and the terminal end E2 of the recessed blade surface S3. As one example, with the depth D being approximately 0.3 mm, the aspect ratio L/D can be set equal to or higher than 10 (opening length L is approximately 3 to 10 mm, for example).

In the present embodiment, in order to suppress change in the stress that acts on the recessed blade surface S3, the recessed blade surface S3 has a shape in which the section is formed of a gentle curved surface and an edge with an acute angle does not exist as viewed in a section obtained by cutting by an orthogonal plane to the rotation center line C as illustrated in FIG. 8. In FIG. 8, the recessed blade surface S3 has an edge with an obtuse angle. However, it is also possible to employ a sectional shape in which an edge does not exist at all. Here, in the case of making an edge with an obtuse angle in the section of the recessed blade surface S3, in the section obtained by cutting by the above-described specific orthogonal plane, an angle formed by normal lines 11 and 12 passing through two points close to each other across an edge (end part in the opening length direction) in the recessed blade surface S3 is defined as θ. In this case, the configuration is made in such a manner that the maximum value of the angle θ (limiting value when the distance between the two points is brought close to 0) falls within a range of 1 degree to 60 degrees. However, even with such an edge with an obtuse angle, chamfering is carried out in order to further suppress stress concentration in some cases.

—Manufacturing of Steam Turbine Rotor Blade—

As described above, the rotor blades 14*d* of the last stage or the rotor blades of the last plural stages are shaped through carving-out by mechanical processing (for example end mill processing) from a material shaped by press processing or casting. The suction side surface S1, the pressure side surface S2, and the recessed blade surface S3 are collectively formed in the same mechanical processing step. Next, shot peening is carried out for at least the airfoil part of the rotor blade carved out by the mechanical processing. Thereby, work hardening of the surface of the rotor blade is intended and the fatigue strength, the abrasion resistance, and the stress corrosion cracking resistance are improved through giving compressive residual stress.

—Remodeling of Steam Turbine Rotor Blade—

A steam turbine rotor blade having the recessed blade surface S3 according to the present embodiment can be manufactured also by employing, as the base, an existing steam turbine rotor blade having a tie-bolt at an intermediate position in the blade length direction and carrying out remodeling through forming the recessed blade surface S3 in this existing steam turbine rotor blade by mechanical processing. Also in this case, shot peening can be carried out for at least the airfoil part of the rotor blade resulting from the additional processing of the recessed blade surface S3.

—Behavior of Water Droplets—

Explanation will be made by taking the last stage of the low pressure turbine 9 as an example. A portion of coarse water droplets that have been grown on the blade surface of the stator blade 20 of the last stage and separated from the stator blade 20 are captured by the vicinity of the leading edge in the suction side surface S1 of the rotor blade 14*d*. Furthermore, separately from such coarse water droplets, a portion of fine water droplets that have been entrained by the gas phase and have passed between adjacent stator blades without adhering to the stator blade makes an inertial impact on the suction side surface S1 and the pressure side surface S2 of the rotor blade 14*d* and is captured thereby. An inertial force associated with rotation of the turbine rotor 12 acts on the water droplet that is captured by the pressure side surface S2 in such a direction as to pull away the water droplet from the pressure side surface S2. However, the water droplets sticks to the pressure side surface S2 due to surface tension and remains on the blade surface. The water droplet that is captured by the suction side surface S1 or the pressure side surface S2 on the root side relative to the tie-boss 28 receives a centrifugal force associated with the rotation of the turbine rotor 12 and is moved toward the blade tip to reach the recessed blade surface S3 at an intermediate part in the blade length direction.

Here, on the water droplet on the blade surface, the resultant force of the centrifugal force associated with the rotation of the turbine rotor 12 and the surface tension acts besides a shearing force due to the gas phase of the steam S. The rotor blade is made of a metal and the blade surface is hydrophilic. Therefore, large surface tension acts on the water droplet with respect to the metal surface. The recessed blade surface S3 is a hollow in the blade surface and therefore a directional component toward the blade root side is generated in the surface tension that acts on the water droplet that has reached the recessed blade surface S3 (force that acts in the normal direction of the blade surface) (FIG. 8). In addition, since the recessed blade surface S3 extends in a strip shape with an inclination with respect to the rotation center line C, a component toward the terminal end E2 of the recessed blade surface S3 is also included in the surface tension that acts on the water droplet on the recessed blade surface S3 (FIG. 7). Thus, a directional component along the recessed blade surface S3 is generated in the resultant force of the surface tension that acts on the water droplet that has reached the recessed blade surface S3 and the centrifugal force (FIG. 7). Therefore, the water droplet that is captured by the blade surface of the rotor blade on the blade root side turns into the direction in which the recessed blade surface S3 extends when reaching the recessed blade surface S3, and is guided by the recessed blade surface S3 to be induced to the terminal end E2. The water droplet that has reached the terminal end E2 of the recessed blade surface S3 is separated from the pressure side surface S2 in the vicinity of the blade trailing edge due to the shearing force of the gas phase of the steam S and is eliminated from the blade surface without reaching the blade tip.

There is a possibility that a portion of water droplets is moved toward the blade tip even when reaching the recessed blade surface S3. However, since the recessed blade surface S3 is a hollow with a curved surface shape as illustrated in FIG. 8, a velocity component oriented from the inside of the section of the blade toward the outside (in this figure, right direction) is given to the water droplet when the water droplet is moved from the inside of the recessed blade surface S3 toward the blade tip, so that the water droplet is separated (detached) from the blade surface. In particular, on the pressure side, the water droplet is separated from the blade surface more readily because the inertial force in such a direction as to get further away from the pressure side surface S2 acts on the water droplet in association with the rotation of the turbine rotor 12 as described above. On the pressure side, the gas phase of the steam S acts in such a direction as to press the water droplet against the pressure side surface S2. However, the water droplet that has been separated from the blade surface is coarse and therefore is less susceptible to the influence of the pressing effect by the gas phase. In addition, the rotor blade turns in such a direction as to get further away from the water droplet that has been separated. Therefore, the water droplet that has been separated does not captured by the pressure side surface S2 again. The water droplet that has been separated from the blade surface is pushed to flow toward the downstream side by the gas phase and is carried to the condenser 11 (FIG. 1).

—Effects—

(1) The rotational energy of the rotor blade is consumed for the movement of water droplets toward the blade tip on the blade surface of the rotor blade. In particular, energy consumed for carrying the water droplets from the root side of the rotor blade to the tip is high, which is a large cause of loss of the rotor blade work. In addition, the water droplets accelerate while coarsening in the process of the movement on the blade surface, and the water droplets that have reached the rotor blade tip exceed the speed of the rotor blade tip and return to the flow of the steam at a supersonic speed to impact on the diaphragm outer ring 18, a seal, and so forth and become a cause of erosion.

In contrast, the recessed blade surface S3 is made in the present embodiment. Thus, as described above, by the resultant force of the centrifugal force and the surface tension, while water droplets are collected by the recessed blade surface S3, the collected water droplets can be induced toward the blade trailing edge at an intermediate position in the blade length direction and be eliminated from the blade surface. Furthermore, even when a portion of water droplets almost gets across the recessed blade surface S3, detachment of the water droplet from the blade surface is promoted as described above and reaching to the blade tip by the water droplet can be suppressed. Due to this, the mechanical work of the rotor blade wastefully consumed for transfer of the water droplets from the blade root side relative to the tie-boss 28 to the blade tip can be reduced and the energy efficiency of the steam turbine can be improved.

Furthermore, the recessed blade surface S3 is not a general groove but a blade surface with an extremely shallow recessed shape formed through partly changing the profile shape of the airfoil, and change in the weight of the rotor blade and the weight distribution caused depending on whether or not the recessed blade surface S3 exists is extremely small. Therefore, the existence of the recessed blade surface S3 hardly affects the strength of the rotor blade and that adjustment of the natural frequency of the rotor blade becomes difficult is also avoided.

As described above, according to the present embodiment, water droplets that are moved on the blade surface of the rotor blade can be effectively guided toward the blade trailing edge while the influence on the strength of the rotor blade is suppressed.

(2) As described above, the water droplets transferred from the blade root side to the rotor blade tip are separated from the blade tip in the state in which they have coarsened, and impact on a structure of the surroundings to possibly cause erosion. It is known that the erosion progresses at a rate in proportion to the third power of the impact speed of the water droplet with respect to the target object.

According to the present embodiment, the water droplets that are captured by the root side relative to the tie-boss 28 can be separated at the recessed blade surface, at which the circumferential speed is lower than that at the blade tip, before reaching the blade tip. There is a possibility that the amount of water droplets that are separated from the rotor blade tip halves due to the existence of the recessed blade surface although depending on the setting position of the recessed blade surface in the blade length direction. Thus, significant suppression of the progression of erosion can also be expected.

(3) The rotor blade 14*d* that is a long blade has a twisted shape as illustrated in FIG. 3. Thus, a water droplet that is captured by the suction side surface S1 at a part close to the root in the blade length direction goes through the leading edge to go round to the pressure side surface S2 when receiving a centrifugal force and moving toward the blade tip. In FIG. 3, the behavior of the water droplet that is captured by the suction side surface S1 is exemplified by a dashed arrow and the behavior of the water droplet after going round to the pressure side surface S2 is exemplified by a solid arrow.

In the present embodiment, by making the recessed blade surface S3 that extends from the suction side surface S1 to the pressure side surface S2 via the blade leading edge E3, water droplets that are captured by the suction side surface S1 in the vicinity of the blade leading edge E3 can be collected at an appropriate place and be reasonably separated from the blade surface as described above.

(4) Furthermore, the recessed blade surface S3 extends in such a manner that the distance from the blade root monotonically increases from the starting end E1 on the suction side to the terminal end E2 on the pressure side, and is inclined to the blade tip side toward the blade leading edge E3 on the suction side. Due to such an inclination of the recessed blade surface, a component toward the terminal end E2 of the recessed blade surface S3 can be given to the resultant force of the centrifugal force and the surface tension in both the suction and pressure sides of the blade. Due to this, the water droplets collected by the recessed blade surface S3 on the suction side can also be induced naturally and smoothly toward the trailing edge by a route that goes through the blade leading edge E3.

(5) The recessed blade surface S3 has a shape that does not have an edge with an acute angle as viewed in a section obtained by cutting by an orthogonal plane to the rotation center line C. This can suppress stress concentration on the recessed blade surface S3.

(6) Moreover, the terminal end E2 of the recessed blade surface S3 is separate from the blade trailing edge and the recessed blade surface does not exist in the vicinity of the trailing edge even in the pressure side surface S2. Water droplets in the vicinity of the blade trailing edge do not have to be induced by the recessed blade surface, and reach the trailing edge by themselves to be eliminated from the blade surface due to the effect of shearing of the gas phase and so forth. Furthermore, the recessed blade surface does not exist also in a region on the trailing edge side in the suction side surface S1. As described above, coarse water droplets possibly are captured by the suction side surface S1 in the vicinity of the leading edge. However, these coarse water droplets go through the blade leading edge E3 to go round to the pressure side surface S2. Therefore, the necessity to form the recessed blade surface in the region on the blade trailing edge side in the suction side surface S1 is low. By accurately grasping the line of flow of water droplets and limiting the setting region of the recessed blade surface to only an appropriate place as above, the influence on the strength of the rotor blade and so forth in association with the formation of the recessed blade surface can be reasonably suppressed.

(7) The aspect ratio L/D of the opening length L and the depth D of the recessed blade surface S3 is approximately $2<L/D<100$. The recessed blade surface S3 does not have an edge with an acute angle as described above. Even when an edge is made in the recessed blade surface S3, the edge is of such a degree that the maximum value of the angle formed by normal lines passing through two points close to each other across the edge falls within a range of 1 degree to 60 degrees. The recessed blade surface S3 is formed through profile adjustment in a range of the machining allowance of a material.

Thus, a mold of press processing or casting does not need to be newly prepared and the rotor blade having the recessed blade surface can be manufactured by diverting an existing mold, and a great advantage is obtained also in view of the manufacturing cost.

(8) Furthermore, the recessed blade surface S3 is extremely shallow as described above and is of such a degree that the recessed blade surface S3 can be formed in a range of the machining allowance of a material. Thus, the recessed blade surface S3 does not include a part that is invisible from the normal direction of the suction side surface S1 or the pressure side surface S2. Due to this, shot peening can be carried out for the whole surface of the airfoil including the recessed blade surface S3.

(9) Moreover, it suffices that the recessed blade surface S3 is an extremely shallow hollow that is of such a degree that change is given to the direction of the surface tension that acts on a water droplet. Since change in the weight and so forth depending on whether or not the recessed blade surface S3 exists is also extremely small as described above, manufacturing through remodeling an existing rotor blade by additional processing is also easy.

Modification Examples

Figure 9:
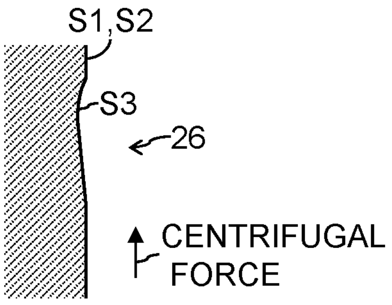
FIG. 9 is a sectional view of a recessed blade surface of a steam turbine rotor blade according to a first modification example.
Figure 10:
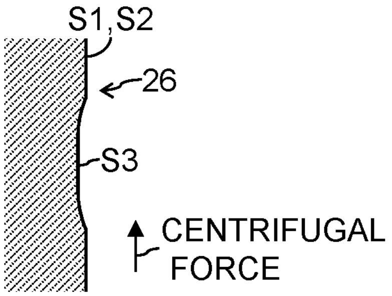
FIG. 10 is a sectional view of a recessed blade surface of a steam turbine rotor blade according to a second modification example.
Figure 11:
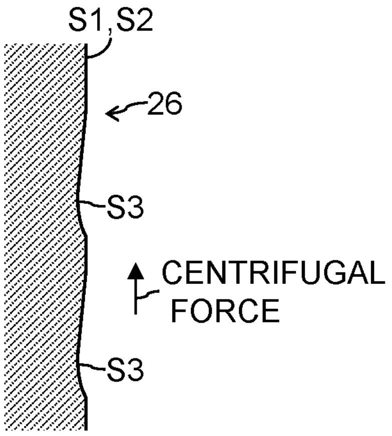
FIG. 11 is a sectional view of a recessed blade surface of a steam turbine rotor blade according to a third modification example.

FIG. 9 is a sectional view of a recessed blade surface of a steam turbine rotor blade according to a first modification example. FIG. 10 is a sectional view of a recessed blade surface of a steam turbine rotor blade according to a second modification example. FIG. 11 is a sectional view of a recessed blade surface of a steam turbine rotor blade according to a third modification example. FIG. 9 to FIG. 11 are figures corresponding to FIG. 8 of the above-described embodiment. As illustrated in these figures, design change in the sectional shape of the recessed blade surface S3 can be carried out as appropriate. As illustrated in FIG. 9, the deepest part of the recessed blade surface S3 may be offset toward the blade tip side and a shape in which the average curvature of the part on the blade tip side in the recessed blade surface S3 is higher relative to the part on the blade root side may be employed. As illustrated in FIG. 10, the recessed blade surface S3 with a sectional shape in which the central part is set as the deepest part may be employed. As illustrated in FIG. 11, plural rows of the recessed blade surface S3 may be made in the blade length direction.

Furthermore, although explanation has been made by taking as an example the configuration in which the recessed blade surface S3 is made at part of the circumference of the rotor blade as viewed in the radial direction, a configuration in which the recessed blade surface S3 is made across the whole circumference of the rotor blade may be employed. Although explanation has been made by taking as an example the configuration in which the recessed blade surface S3 is made from the suction side to the pressure side, a configuration in which the recessed blade surface S3 is made only on the pressure side may be employed.

DESCRIPTION OF REFERENCE CHARACTERS

14*a* to 14*d*: Steam turbine rotor blade
28: Tie-boss
C: Rotation center line
D: Depth
E1: Starting end
E2: Terminal end
E3: Blade leading edge
11, 12: Normal line
L: Opening length
L/D: Aspect ratio
S1: Suction side surface
S2: Pressure side surface
S3: Recessed blade surface
θ: Angle formed by normal lines

What is claimed is:

1. A steam turbine rotor blade having a tie-boss for joining to adjacent blades at an intermediate position in a blade length direction, the steam turbine rotor blade comprising:

an airfoil part in which a blade surface is partly hollow as viewed in a section obtained by cutting the airfoil part with an orthogonal plane to a rotation center line of a turbine and wherein a recessed blade surface forms the hollow partial blade surface and is positioned radially below the tie-boss at least in a region on a pressure side, and wherein the recessed blade surface extends in a strip shape in a blade chord length direction, wherein a starting end of the recessed blade surface that extends in the strip shape is located in a suction side surface and a terminal end of the recessed blade surface is located in a pressure side surface, the recessed blade surface is continuous from the starting end to the terminal end via a blade leading edge and extends such that a distance from a blade root monotonically increases from the starting end to the terminal end, and on a suction side of the rotor blade, the recessed blade surface is inclined outward in a radial direction toward the leading edge of the rotor blade, and on a pressure side of the rotor blade, the recessed blade surface is inclined outward in the radial direction toward a blade trailing edge.

2. The steam turbine rotor blade according to claim 1, wherein the recessed blade surface has a curved shape as viewed in the section obtained by cutting the airfoil part with the orthogonal plane to the rotation center line.

3. The steam turbine rotor blade according to claim 1, wherein $2<L/D<100$ is satisfied when an opening length of the recessed blade surface is defined as L and a depth of the recessed blade surface is defined as D and an aspect ratio of the recessed blade surface is defined as L/D in the section obtained by cutting the airfoil part with the orthogonal plane to the rotation center line.

4. The steam turbine rotor blade according to claim 1, wherein a maximum value of an angle formed by normal lines normal to a blade surface and passing through two points on the blade surface close to each other across an edge in the recessed blade surface is in a range of 1 degree to 60 degrees in the section obtained by cutting the airfoil part with the orthogonal plane to the rotation center line.

5. The steam turbine rotor blade according to claim 1, wherein the airfoil part is carved out by mechanical processing and a depth of the recessed blade surface is equal to or smaller than a machining allowance in the mechanical processing.

6. A manufacturing method of the steam turbine rotor blade according to claim 1 having the tie-boss for joining to adjacent blades at the intermediate position in the blade length direction, the manufacturing method comprising:

carving out the steam turbine rotor blade having the recessed blade surface of by mechanical processing; and carrying out shot peening for the airfoil part.

* * * * *